Dec. 19, 1922.
A. H. SELL.
FASTENER FOR TAPE MEASURES AND OTHER ARTICLES.
FILED NOV. 15, 1921.
1,439,645.
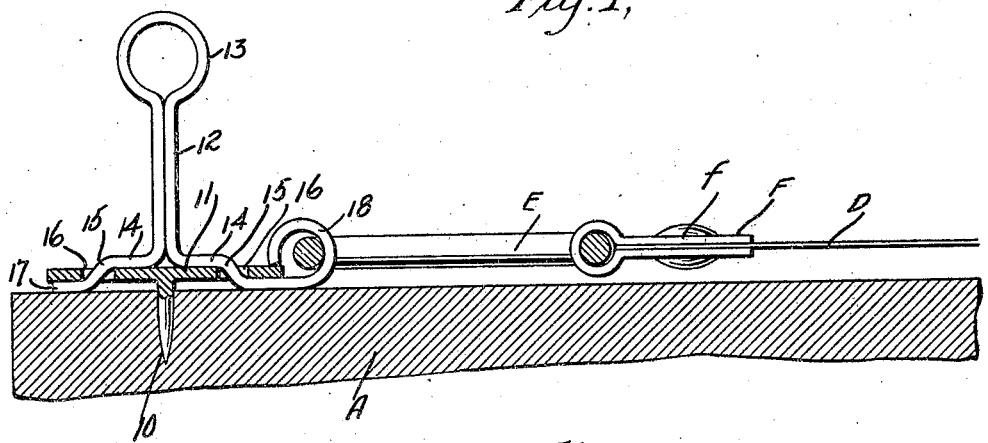
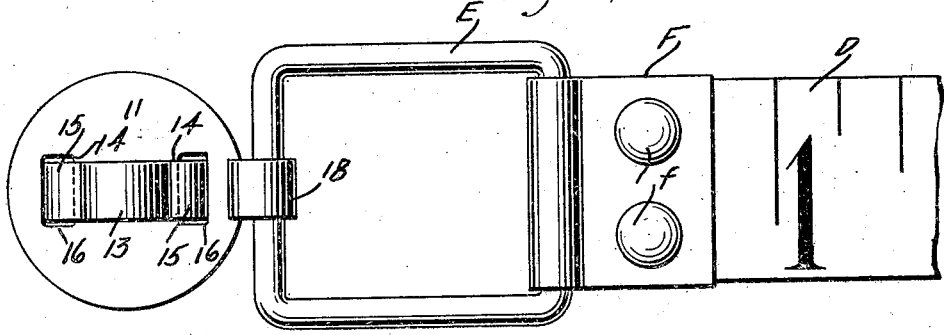
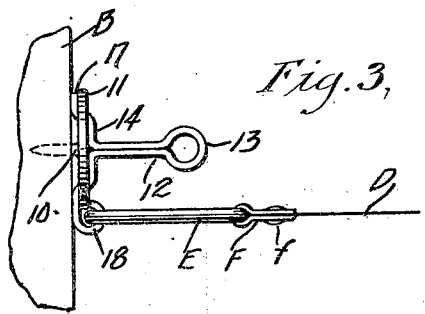
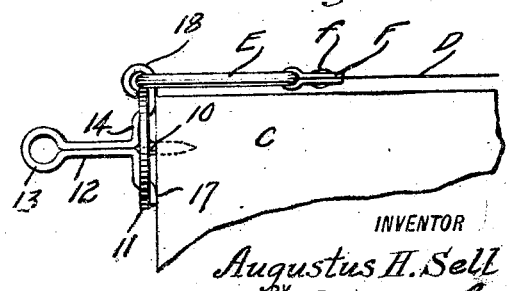
WITNESSES
INVENTOR
Augustus H. Sell
BY
ATTORNEYS Patented Dec. 19, 1922.

1,439,645

UNITED STATES PATENT OFFICE.

AUGUSTUS HARMON SELL, OF NEWARK, NEW JERSEY.

FASTENER FOR TAPE MEASURES AND OTHER ARTICLES.

Application filed November 15, 1921. Serial No. 515,327.

*To all whom it may concern:*

Be it known that I, AUGUSTUS HARMON SELL, a citizen of the United States, and a resident of Newark, in the county of Essex and State of New Jersey, have invented a new and Improved Fastener for Tape Measures and Other Articles, of which the following is a description.

My invention relates to a fastening means especially useful as an attachment to a tape measure for securing the same at one end so that one person may take measurements without the necessity of a second person holding the tape but the device is used for other purposes as a fastening means for holding an end of a string or as a hanger or fastener for things to be secured to a wall or other surface.

The general object of my invention is to provide a fastener for the indicated purpose and improved in various particulars, whereby to possess distinctive characteristics and advantages which will clearly appear as the description proceeds.

Suffice it to say here that the construction and arrangement of parts provides for holding the end of the tape as closely as possible to the object from which the measurement is to be started and the attachment is of such a character that it may be readily applied to tape measures in use or as made up at the factory and this without altering the construction of the device in any way or without altering the conventional tape measure.

Reference is to be had to the accompanying drawings forming a part of this specification, it being understood that the drawings are merely illustrative of one example of the invention.

Figure 1 is a longitudinal vertical section of a tape measure and my improved fastener showing the same as employed for securing the tape measure to the ground or to flooring;

Figure 2 is a plan view of the device as arranged in Figure 1;

Figure 3 is a side elevation showing the use of the device for fastening the tape or the like at one end to a side wall as in measuring the distance between two walls;

Figure 4 is a view similar to Figure 3 but showing the device as employed for securing the tape measure at an end of an object such as a stud, joist or board.

Figure 1 indicates the manner of applying the fastener to a flooring or the ground as indicated conventionally at A; B, in Figure 3 represents a wall; and C, an end of a joist, stud, or the like. D indicates the usual tape measure having the usual square loop E secured by a strap F turned on itself and riveted as at *f* to the tape measure.

In carrying out my invention a point 10 is provided in association with a shank and fixed thereto, advantageously through the medium of a head 11 on the point as hereinafter further referred to. The shank 12 is formed with an eye 13 or equivalent formation at the end to afford a finger hold. Said shank in the illustrated example is formed of a strip of flat metal bent on itself and given a loop form to constitute the eye 13. From the eye 13 to the base the shank is straight and of double thickness, the material being bent at opposite sides laterally outward as at 14, and then obliquely as at 15 to pass through holes 16 in the head 11 of the fastening point 10.

The base of the shank at one end terminates in a laterally disposed end 17 lying beneath the head 11. At the opposite side material is carried from the oblique portion 15 laterally outward beyond the head 11 and formed into an eye 18 loosely embracing the adjacent outer end of the loop E of the tape measure or said eye 18 may receive a cord or any other article to be held or suspended by tying, hooking, or otherwise engaging the same with said eye 18.

In the arrangement in connection with a tape measure the device may be arranged in the plane of the tape measure and its loop E to all lie flat on a flooring or other surface, and the arrangement permits of the end of the loop E being along a given line from which the measurement is to be taken.

In Figure 3 I have shown the base of the shank 12 and the head 11 of the point 10 disposed vertically with the point 10 penetrating the vertical wall B, so that the tape measure may depart horizontally at right angles to the head 11.

In Figure 4 the head 11 and the base of the shank 12 are similarly disposed vertically at an end of the joist, stud, or the like, indicated at C, the tape measure and its loop E running at right angles to said base and said head along the surface of the joist or the like.

I would state in conclusion that while the illustrated example constitutes a practical embodiment of my invention, I do not limit myself, strictly, to the exact details herein illustrated, since, manifestly, the same can be considerably varied without departure from the spirit of the invention as defined in the appended claims.

Having thus described my invention, I claim:

1. A fastener of the class described including a base having an integral fastener point thereon, a shank carried by said base, and means integral with said shank at the lower end thereof to secure the fastener to the article to be fastened.

2. A fastener of the class described including a base presenting a pair of openings and a fastener point adjacent its center, a shank presenting a pair of arms passing through said openings, one of said arms being formed into a hook to which the article to be fastened is secured.

3. A fastener of the class described including a fastener point having a head, and a separate shank held to said head and having a base provided with means to secure the base to an article to be fastened.

4. A fastener of the class described including a fastener point having a head, a shank having a base held to said head, the base presenting portions extending in opposite directions projecting through openings in said head, one of said portions extending laterally beyond said head and formed with means to secure it to an article to be fastened.

5. A fastener of the class described including a fastener point having a head formed with holes therein at opposite sides of the center, and a shank having a base lying against the outer face of said head laterally inward of said holes, said base presenting portions extending through said holes and then laterally outward beneath the head, one of said base portions adapted to connect with an article to be fastened.

AUGUSTUS HARMON SELL.